US011218398B2

(12) United States Patent
Chisholm

(10) Patent No.: US 11,218,398 B2
(45) Date of Patent: Jan. 4, 2022

(54) SYSTEM, METHOD, AND COMPUTER PROGRAM FOR CLOSED LOOP MANAGEMENT OF A NETWORK

(71) Applicant: Amdocs Development Limited, Limassol (CY)

(72) Inventor: Sharon Chisholm, Ottawa (CA)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/667,755

(22) Filed: Oct. 29, 2019

(65) Prior Publication Data
US 2021/0126851 A1 Apr. 29, 2021

(51) Int. Cl.
*H04L 12/26* (2006.01)
*G06F 9/455* (2018.01)
*H04L 12/911* (2013.01)

(52) U.S. Cl.
CPC .......... *H04L 43/50* (2013.01); *G06F 9/45558* (2013.01); *H04L 47/82* (2013.01); *G06F 2009/45595* (2013.01)

(58) Field of Classification Search
CPC ..... H04L 43/08; H04L 43/0817; H04L 67/10; H04L 41/0853; H04L 63/10; H04L 63/1425; H04L 41/082; H04L 41/0873; H04L 41/145; H04L 41/5025; H04L 43/50; H04L 1/244; H04L 43/04; H04L 47/82; H04L 43/16; G06F 11/3409; G06F 11/0793; G06F 2009/45575; G06F 2201/865; G06F 11/0784; G06F 11/079; G06F 11/324; G06F 11/2273; G06F 9/45558; G06F 21/554; G06F 11/1443;
(Continued)

(56) References Cited

U.S. PATENT DOCUMENTS

| 2005/0033527 A1* | 2/2005 | Wada ................. G05B 23/0227 702/35 |
| 2008/0235633 A1* | 9/2008 | Ghiloni ............... G06F 11/3676 715/862 |

(Continued)

FOREIGN PATENT DOCUMENTS

EP  0508571 A2  10/1992

OTHER PUBLICATIONS

Weihmayer et al., "Modeling cooperative agents for customer network control using planning and agent-oriented programming," GLOBECOM '92—Communications for Global Users: IEEE, Dec. 6, 1992, pp. 537-543.

*Primary Examiner* — Tonia L Dollinger
*Assistant Examiner* — Linh T. Nguyen
(74) *Attorney, Agent, or Firm* — Zilka-Kotab, P.C.

(57) ABSTRACT

As described herein, a system, method, and computer program are provided for closed loop management of a network. In use, a goal state is stored for a resource in a network. Additionally, an actual state of the resource is monitored. Further, divergence of the actual state of the resource from the goal state stored for the resource is detected, based on the monitoring. Still yet, a solution to return the actual state of the resource to the goal state is determined, where the solution includes a computed activity path that returns the actual state of the resource to the goal state. The solution is then executed to return the actual state of the resource to the goal state.

12 Claims, 6 Drawing Sheets

(58) Field of Classification Search
CPC ............. G06F 11/3688; G06F 11/3692; G06F
11/0766; G06F 11/0772; G06F 11/0787;
G06F 11/27; G06F 11/30; G06F 11/34;
G06F 11/3466; G06F 11/366; G06F
11/3664; G06F 11/3672; G06F 11/3684;
G06F 21/552; G06F 2201/86; G06F
2221/033; G06F 11/3414; G05B
19/41865; G05B 2219/31397; G05B
2219/31449
See application file for complete search history.

(56) References Cited

U.S. PATENT DOCUMENTS

| | | | |
|---|---|---|---|
| 2009/0319829 A1* | 12/2009 | Takayama | G06F 11/263 |
| | | | 714/32 |
| 2010/0235814 A1* | 9/2010 | Ohta | G06F 11/3684 |
| | | | 717/124 |
| 2011/0054643 A1* | 3/2011 | Law | G05B 23/0256 |
| | | | 700/79 |
| 2014/0164585 A1 | 6/2014 | Shaw et al. | |
| 2014/0298101 A1* | 10/2014 | Bai | G06F 11/3414 |
| | | | 714/37 |
| 2014/0325486 A1* | 10/2014 | Zhang | G06F 11/3664 |
| | | | 717/125 |
| 2015/0293173 A1* | 10/2015 | Tsuboi | G06F 11/08 |
| | | | 714/727 |
| 2016/0057025 A1* | 2/2016 | Hindrichs | H04L 12/24 |
| | | | 709/224 |
| 2017/0010956 A1* | 1/2017 | Chen | G06F 11/36 |
| 2017/0161180 A1* | 6/2017 | Raghavan | G06F 11/3684 |
| 2019/0332423 A1* | 10/2019 | Shanmugam | G06F 9/4881 |
| 2020/0145299 A1* | 5/2020 | Do | G06F 9/45558 |
| 2020/0210592 A1* | 7/2020 | Karas | G06F 21/552 |

\* cited by examiner

SYSTEM, METHOD, AND COMPUTER PROGRAM FOR CLOSED LOOP MANAGEMENT OF A NETWORK

FIELD OF THE INVENTION

The present invention relates to network management, and more particularly to addressing functional issues in networks.

BACKGROUND

Communication networks are complex ecosystems of physical and/or virtual resources working together to provide safe, responsive end to end services to customers. Ensuring these networks are functioning as expected is a complex and time consuming task, typically requiring manual action. Human operators can struggle with understanding and responding to all but the most critical of problems, thus failing to address functional issues that may compromise customer usability of the network.

There is thus a need for addressing these and/or other issues associated with the prior art.

SUMMARY

As described herein, a system, method, and computer program are provided for closed loop management of a network. In use, a goal state is stored for a resource in a network. Additionally, an actual state of the resource is monitored. Further, divergence of the actual state of the resource from the goal state stored for the resource is detected, based on the monitoring. Still yet, a solution to return the actual state of the resource to the goal state is determined, where the solution includes a computed activity path that returns the actual state of the resource to the goal state. The solution is then executed to return the actual state of the resource to the goal state.

DETAILED DESCRIPTION

Figure 1:
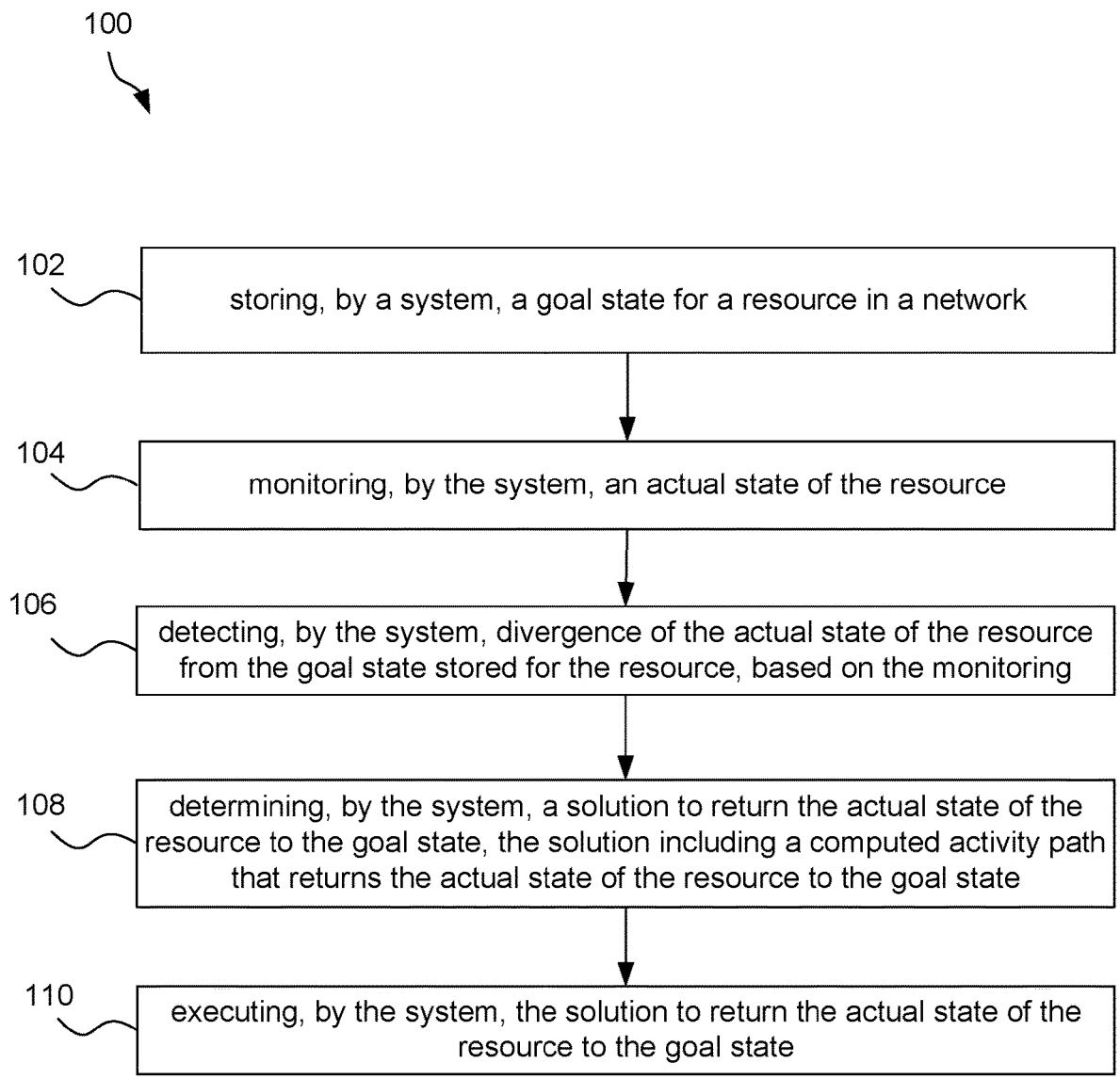
FIG. 1 illustrates a method for closed loop management of a network, in accordance with one embodiment.

FIG. 1 illustrates a method 100 for closed loop management of a network, in accordance with one embodiment. The method 100 may be performed by one or more computer systems within a network, such as the computer systems described below with reference to FIGS. 4 and/or 5. The computer system(s) may be operated by the network operator or by a third-party providing network management for the network operator. Further, the network may be a virtual network having virtual resources, a physical network having physical resources, or a hybrid network having both a virtual portion with virtual resources and a physical portion with physical resources.

As shown in operation 102, a goal state is stored for a resource in a network. The network may be one of the networks mentioned above. Accordingly, the resource may be a physical resource in at least a physical portion of the network, such as a server, computer processor, memory, network service, physical network function (PNF), physical port, etc. As another option, the resource may be a virtual resource in at least a virtual portion of the network, such as a virtual machine (VM), virtual network function (VNF), virtual port, etc.

The goal state may be any one of a plurality of possible states in which the resource is capable of existing in the network. In other words, one of the possible states may be designated (i.e. predefined) as the goal state for the resource. The possible states for the resource may include an activated state (e.g. the resource is active in the network), a deactivated state (e.g. the resource is not active in the network), or any other state in which the resource is capable of existing in the network.

The goal state is stored in association with an identifier of the resource, so that the goal state for the resource can be retrieved using the identifier of the resource. The identifier of the resource may indicate the specific resource itself, or may indicate a type of the resource. In this way, the goal state may be stored against either a resource type or a resource instance.

As a further option, additional information may also be stored for the resource. For example, the additional information may also be stored in association with the identifier of the resource, or in association with the goal state for the resource. The possible use of such additional information will be set forth in detail below.

In one embodiment, the additional information may include a test for detecting a divergence from the goal state. For example, the test may indicate which aspects of the resource to analyze to determine when the state of the resource has diverged from the goal state.

In another embodiment, the additional information may include a definition for each action of a plurality of actions associated with the resource. The actions may include start, stop, heal, rebuild, lock, unlock, configuration backup, configuration restore, migrate, snapshot, rollback, or any other action capable of being taken in association with the resource. Each definition for a corresponding action may include one or more preconditions for the action, an indication of the action (e.g. state(s) of the resource and/or other resources required for the action to be performed), one or more post-conditions for the action (e.g. state(s) of the resource and/or other resources as a result of the action being performed), and optionally an indication of an impact to (e.g. usage of, etc.) the network caused by the action.

Additionally, as shown in operation 104, an actual state of the resource is monitored. It should be noted that the actual state of the resource may be monitored in any desired manner. Just by way of example, the actual state of the resource may be monitored by listening to events occurring in the network in association with the resource and detecting the actual state of the resource responsive to each of the events.

Further, as shown in operation 106, divergence of the actual state of the resource from the goal state stored for the resource is detected, based on the monitoring. In particular, the divergence may be detected when the actual state of the resource does not match the goal state stored for the resource.

In one embodiment, the divergence may be detected utilizing a test for detecting a divergence of the actual state from the goal state. For example, the test may be that described above as being stored in association with the identifier of the resource and/or the goal state stored for the resource. Thus, a test specific to the resource may be utilized, or executed, to detect the divergence of the actual state of the resource from the goal state stored for the resource. Optionally, the test for divergence may be performed after periodic polling or monitoring of the resource state or responsive to the resource changing state.

Still yet, as shown in operation 108, a solution to return the actual state of the resource to the goal state is determined, where the solution includes a computed activity path that returns the actual state of the resource to the goal state. In one embodiment, the activity path may be computed responsive to detecting the divergence of the actual state of the resource from the goal state. Thus, the activity path may be computed as needed to return the resource from the actual state to the goal state.

In another embodiment, the computed activity path may be predefined (e.g. in a library, etc.) as the solution for returning the actual state of the resource to the goal state. This may allow the resource to be returned from the actual state to the goal state more quickly by eliminating any delay from having to compute the activity path responsive to detecting the divergence of the actual state of the resource from the goal state. With respect to this embodiment, the activity path may be computed responsive to onboarding of the resource to the network (e.g. storage of goal state, etc. for the resource) and prior to detecting the divergence of the actual state of the resource from the goal state. As another example, the activity path may be computed responsive to storing a new definition for an action associated with the resource and prior to detecting the divergence of the actual state of the resource from the goal state.

In one embodiment, the activity path may be independent of the specific resource instance, and for example associated with the resource type. In another embodiment, the activity path may be specific to resource instance, in which case the activity path may have more specific details defined.

As noted above, the activity path is computed such that the activity path can be executed to return the actual state of the resource to the goal state. The activity path may be a sequence of actions (e.g. selected from the actions stored for the resource). For example, the activity path may include actions from the resource in the wrong state, as well as other resources it is dependent on. In one embodiment, a forward state space search may be utilized to compute the activity path. For example, where the pre-conditions and post-conditions are stored for the resource, as noted to be an option above, the activity path may be computed (e.g. as the sequence of actions) using the preconditions and the post-conditions stored in the definition for each action. It should be noted that the post-conditions of the previous step in the action sequence may always ensure that the preconditions of the next step can be met. Of course, in other embodiments machine learning or other algorithms may be used to compute the activity path.

As an option, the solution may be determined based on the indication of the impact to the network caused by each action stored for the resource. For example, the network impact caused by the actions included in the activity path may be computed and used as criteria upon which the solution is determined. In one embodiment, where multiple possible activity paths are able to return the actual state of the resource to the goal state, the activity path that is least impactful to the network may be selected for the solution.

As shown in operation 110, the solution is executed to return the actual state of the resource to the goal state. In particular, the activity path may be followed to return the actual state of the resource to the goal state. For example, where the activity path includes a sequence of actions, the sequence of actions may be executed to return the actual state of the resource to the goal state.

To this end, closed loop management of the network resource may be provided, without necessarily requiring human intervention. Furthermore, resources may be returned to their goal state responsive to detecting a divergence therefrom, thus correcting any unwanted resource states in the network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
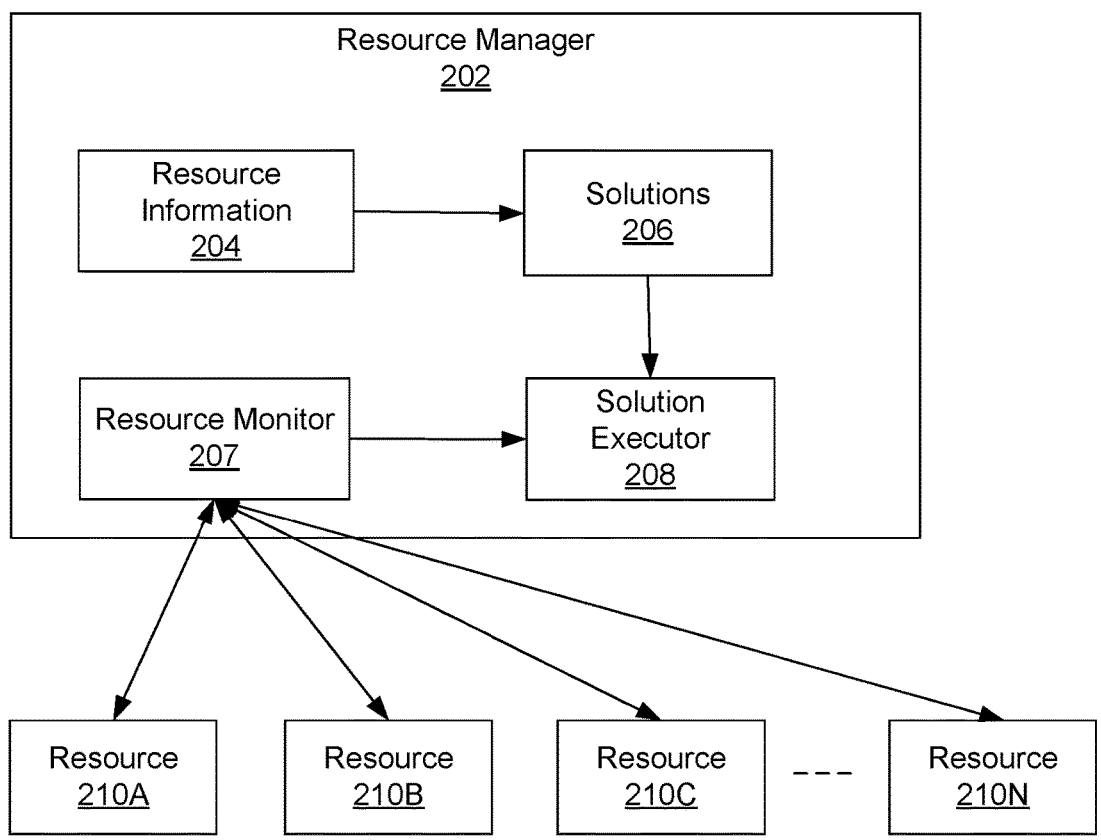
FIG. 2 illustrates a system for closed loop management of a network, in accordance with one embodiment.

FIG. 2 illustrates a system 200 for closed loop management of a network, in accordance with one embodiment. The system 200 may be implemented to carry out the method 100 of FIG. 1. Thus, the definitions and descriptions provided above may equally apply to the present embodiment.

The system 200 includes a resource manager 202 that provides closed loop management of resources 210A-N in a network. Thus, it is the resource manager 202 that may implement the method 100 of FIG. 1. The resource manager 202 may be in communication with the resources 210A-N via the network.

The system 200 leverages classical planning algorithms from the field of Artificial Intelligence to calculate the best solution to a given network issue dynamically as both the network and the network state evolves over time. This solution minimizes the complexity of adding closed loop support for new services and resources to the network, by only requiring the definition of discrete actions related to given resources that may help resolve problems found. The discrete definition defines its pre-conditions, action to take and post-conditions. This is then used as input into a search algorithm as it searches for a set of steps (i.e. sequence of actions) capable of returning the network to its healthy goal state.

The resource manager 202 stores resource information 204 that includes information for resources, including a goal state. The resource manager 202 also includes a resource monitor 207 capable of monitoring the resources 210A-N to detect divergence of an actual state of a resource 210A-N from a goal state stored for the resource 210A-N in the resource information 204. As further shown, the resource manager 202 stores solutions 206, including activity paths, for returning certain actual states of the resources 210A-N to the goal states stored for the resources 210A-N. The solutions 206 may be determined from the resource information 204. For example, the activity paths included in the solutions 206 may be computed from the resource information 204.

Still yet, the resource manager 202 includes a solution executor 208 that executes a solution determined for a resource 210A-N that has an actual state determined to have diverged from a goal state stored for the resource 210A-N. The solution executor 208 itself may execute the solution or may cause the resource 210A-N to execute the solution. More details regarding each component of the resource manager 202 are provided as follows.

Resource Information 204

When on-boarding new resources, the goal state is defined. One example of the goal state stored for a resource is shown in Table 1.

TABLE 1

VM
state = up

A test may be also be defined to detect when an actual state of the resource diverges from the goal state. One example of the goal state and test stored for a resource is shown in Table 2.

TABLE 2

VNF
state = up
test: health-check = ok

To onboard new actions for a resource, the preconditions for each action, the actions themselves, the postconditions of each action, as well as the cost/impact of the action (optional) may be defined. The following definitions shown by way of example in Table 3 apply to any instance of a given resource type, where ^ is a logical AND.

TABLE 3

Action(MyAction(resource1, variable1, variable2...),
PRECONDITION: State(resource1, state1)^ State(resource2, state2)^In(resource2, resource1)
Detailed Action: step1 resource1
POSTCONDITION: State(resource1, state2)^ State(resource2, state2)^In(Resource2, Resource1)
WEIGHT: impactLevel Note that other attributes and relationships can be defined beyond the State and In defined above. Also, pre and post conditions can be defined as not a particular state, for example as shown in Table 4.

TABLE 4

State(resource1, state2)

To better explain the concept, consider the following example in Table 5 of restarting a VNF, but only if the VM it is deployed in is already healthy.

TABLE 5

Action(RestartVnf(vnf),
PRECONDITION: State(vnf, down)^ State(vm, up)^In(vm, vnf)
Detailed Action: restart vnf
POSTCONDITION: State(vnf, up)^ State(vm, up)^In(vm, vnf)
WEIGHT: impactLevel=low Or the following action as shown in Table 6 to restart a VM, but only if its compute/cloud host is up.

TABLE 6

Action(RestartVm(vm),
PRECONDITION: State(vm, down)^ State(compute, up)^In(compute, vm)
Detailed Action: restart vm
POSTCONDITION: State(vm, up)^ State(compute, up)^In(compute, vm)
WEIGHT: impactLevel=medium Resource Monitor 207

Through a combination of listening to events and actively monitoring resources, it may be determined when one or more resources has diverged from its goal state.

Solutions 206

In order to compute a path to the goal state, it can be treated as a single set of states, or partitioned into relatively independent collection of states or order to reduce the complexity of the search and allow for parallel paths to be executed independently, leading to faster resolution. For example, the resources in two different geographic sites can be treated as two different problems to resolve, or the entire network may be considered as a whole according to a network state, where the network state includes the collection of states of all resources in that network.

Forward state-space search algorithms can then be applied to find a path from the current state to the goal state using the pre and post conditions available in the given set of actions. Forward state (starting from current state), as opposed to backward state (starting at the goal), may be utilized since it allows simple modification to allow partial resolution paths that bring the system closer to the goal state, even if a full path cannot be found. Any classical search algorithm (breadth first search, depth first search, uniform search, greedy best first graph and A*) can be used, but some will have better results, particularly those that are guaranteed to find the shorted path.

Paths can be found with or without using the weights optionally provided during on-boarding. The weights or costs are defined to reflect the impact of a given operation. Without taking this into consideration, the shortest path to resolve all problems may just be to constantly restart everything. By adding a cost associated with the impact of a given operation, we can favor paths back to the goal state that are least impactful to the network. Rather than restarting a VM with 10 healthy VNFs and 2 unhealthy ones, we can favor just restarting the two problem VNFs.

Search algorithms that benefit from heuristics, including those that use a planning graph, can use a state abstraction that looks at the number of resources in their goal state at any given time.

Table 7 illustrates an example of a computed activity path for a VNF being down when its VM is healthy.

TABLE 7 restartVNF(vnf1)

But if the VM is itself having issues, the activity path for the solution might be that shown in Table 8.

TABLE 8 startVM(vm3)
restartVNF(vnf1)

Note, a variant would be to compute activity paths for all possible error scenarios every time a new resource or action was onboarded and store these for faster execution at runtime.

Solution Executor 208

The solution that results from the classical search is a set of steps that can then be executed to return the network, a subset of the network, or just specific resources to its goal state.

Each step of the solution is executed and monitored to see when the post conditions are true. If either an error occurs or a predetermined amount of time has passed without a response, then the solution executor 208 can either retry or terminate the closed loop action with an error, depending on how the resource manager 202 is configured. In the case of termination, an alarm may be raised.

Figure 3A:
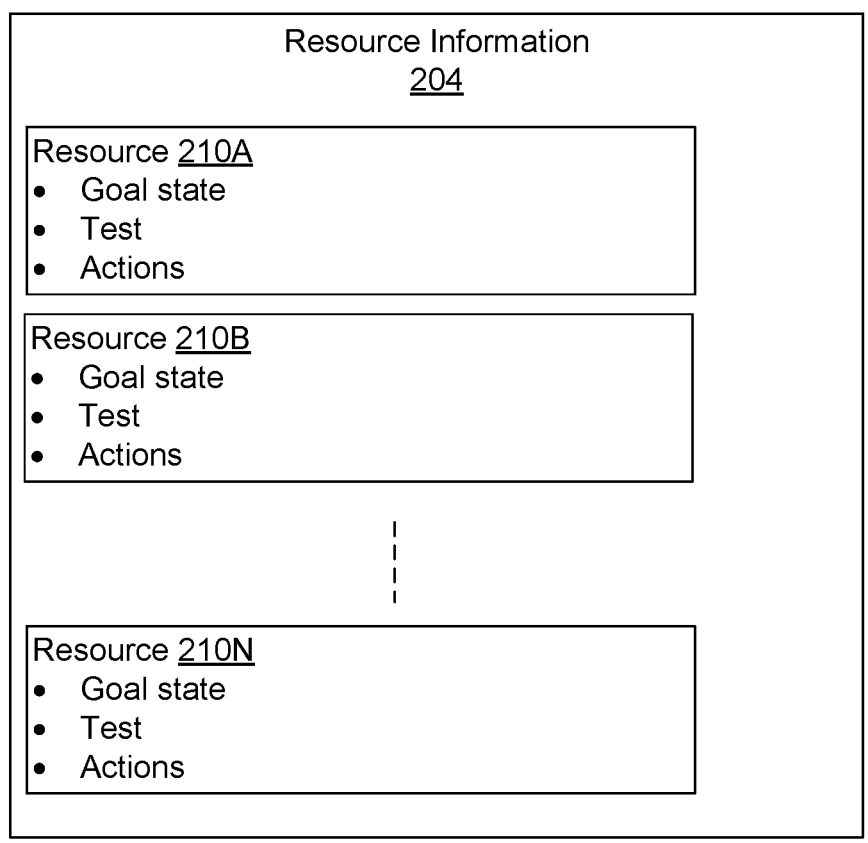
FIG. 3A illustrates a data structure storing information for a resource in a network to enable closed loop management of the resource, in accordance with one embodiment.

FIG. 3A illustrates a data structure 300 storing information for a resource in a network to enable closed loop management of the resource, in accordance with one embodiment. The data structure may be a database having a record for each network resource, or may be any other type of data structure storing entries for each network resource. In any case, the data structure 300 is one embodiment of the storage for the resource information 204 of the system 200 of FIG. 2.

As shown, the resource information 204 includes an entry (e.g. record) for each resource 210A-N in the network. Each entry for a corresponding resource includes information such as a goal state for the resource, a test for detecting a divergence of an actual state of the resource from the goal state, and definitions of actions capable of being performed in association with the resource. The action definitions may each include an indication of the action, preconditions for the action, postconditions for the action, and an impact of the action on the network when performed.

Figure 3B:
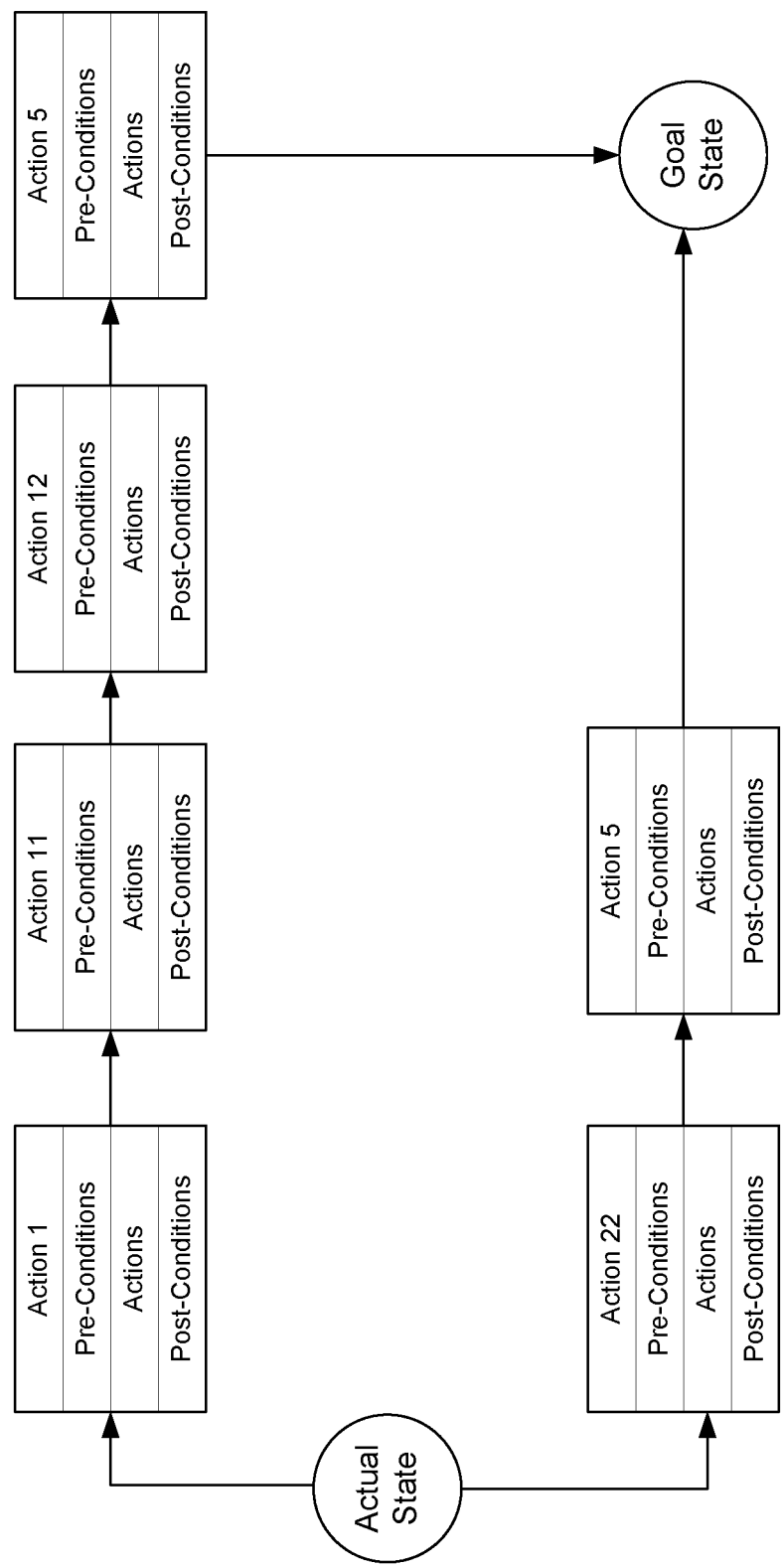
FIG. 3B illustrates multiple activity paths to return an actual state of a resource to a goal state, in accordance with one embodiment.

FIG. 3B illustrates multiple activity paths to return an actual state of a resource to a goal state, in accordance with one embodiment. The activity paths may each represent a solution determined to return the actual state of the resource to the goal state. In the embodiment shown, two separate activity paths are computed for returning the actual state of the resource to the goal state. Of course, it should be noted that the embodiment shown is for illustrative purposes only, and that a particular resource may have any number of different solutions for returning its actual state to its goal state. Moreover, multiple solutions may share one or more actions (as shown), or even a solution may branch off another solution (not shown).

With respect to the present embodiment, each step (action) in an activity path transforms a current state of the resource to a next state. Thus, the first step in an activity path transforms the actual state of the resource to a next state, and the final step in the activity path transforms a current state of the resource (resulting from the prior step) to the goal state of the resource. One or more post-conditions of one step in an activity path will match one or more pre-conditions of a subsequent step in the same activity path. Each step in an activity path includes one or more actions that transform the current state of the resource to the next state of the resource.

Definitions

Network Virtual Function (NFV)

Network Virtualized Functions is a movement in the networking industry to virtualize network functions. These virtualized functions run on virtual machine rather than on dedicated hardware Hybrid Networks are networks that a combination of NFV and traditional physical network equipment. This means that functions can either be virtual or physical.

Virtual Machine (VM) is an emulator of a computer system. They run on specialized hardware, capable of supporting multiple VMs, each able to mimic the capabilities of a physical computer.

Virtual Network Function (VNF) is a specific network function like routing or firewall independent to be deployed on one or more virtual machines.

Virtual Network Function Component (VNFc) is a component of a VNF. A VNF may be broken up into multiple VNFcs, each deployed on their own VM.

Physical Network Function (PNF) is network function coupled with its physical hardware Closed Loop Closed loop is the process of detecting and correcting network issues without explicit operator action Classical Planning Classical planning is a set of algorithms from the field of artificial intelligence used to solve problems whose solution is not already known. It searches for a plan to achieve a known goal. The benefit of classical planning algorithms is their ability to scale up to larger problems spaces.

Initial state is the current state of the system.

Goal State is the state we are trying to get to Actions are the steps in the plan that change the state of the system. They consist of preconditions that must be true before the action can be performed, the actual action to be performed and the post-conditions or the effect that will have taken place once the action has been executed.

Forward state searches start at the initial or current state and search for a path to the goal state. Backward state searches start at the goal state and search for a path back to the goal state. The resulting plan is always executed starting at the initial state regardless of how it was computed.

Heuristic is an estimation of the relative worth of a particular path, without the full cost of computing its actual worth as a solution. I.e., it should not be required to solve the given planning problem to calculate the heuristic, but it should still be helpful in selecting preferred paths.

Plan is the resulting set of ordered actions that lead from the current state to the goal state.

Planning Graph is a data structure sometimes used in classical planning as it can provide better heuristic estimates. A planning graph is a directed graph organized into levels. Even levels consists of nodes presenting each state value, starting with level 0, the initial state. Odd levels consists of the possible actions that can be performed in each of the states, which in turn link to the outcome of those actions in the next even leveled state, right down into the goal state. Note the planning graph defines multiple possible actions at each level of the graph.

Search Algorisms include breadth first search, depth first search, uniform search, greedy best first graph and A*). Note that depth first search is not guaranteed to find the shortest path. Breath first search and A* are guaranteed to find the shortest path.

Figure 4:
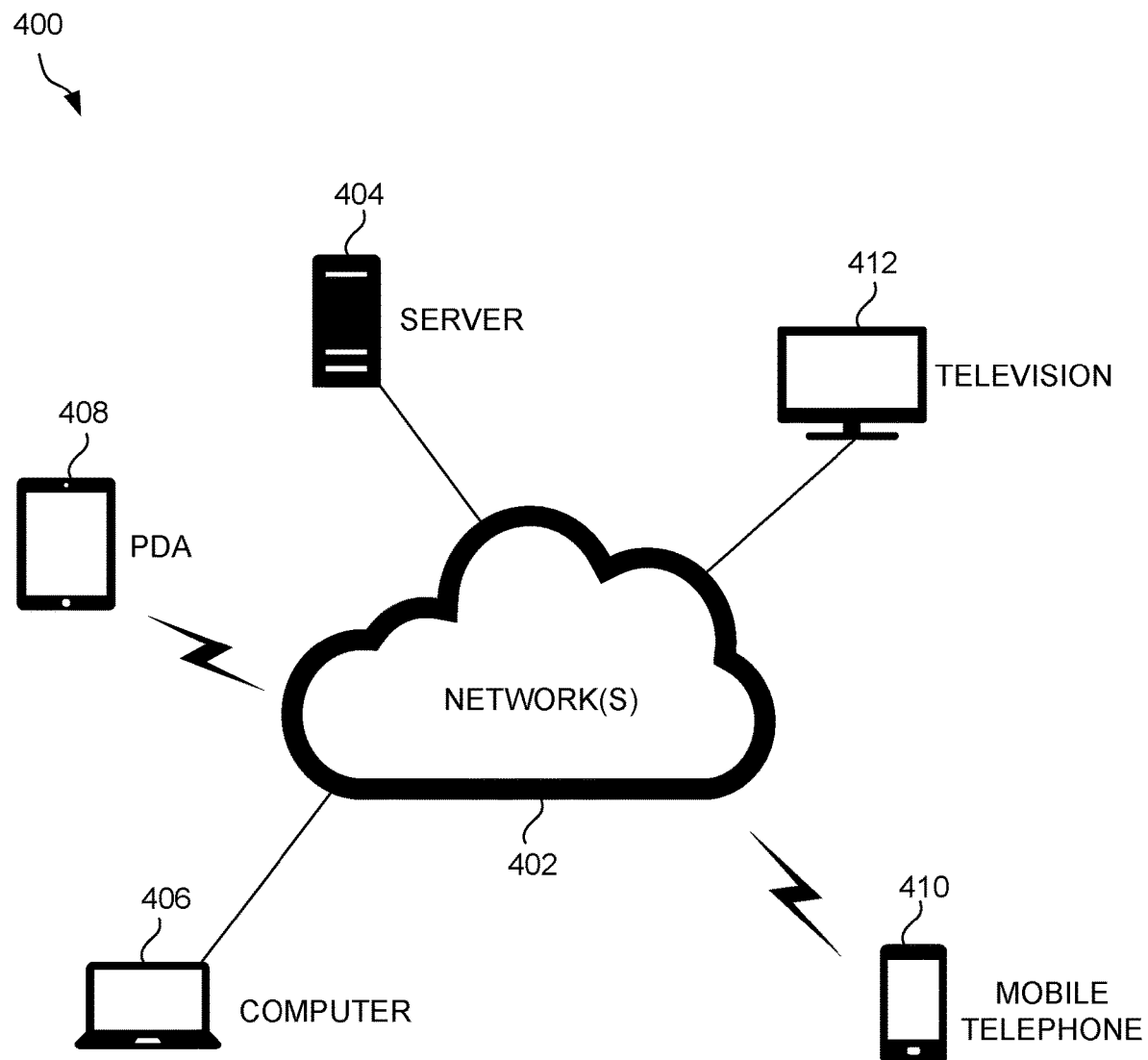
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
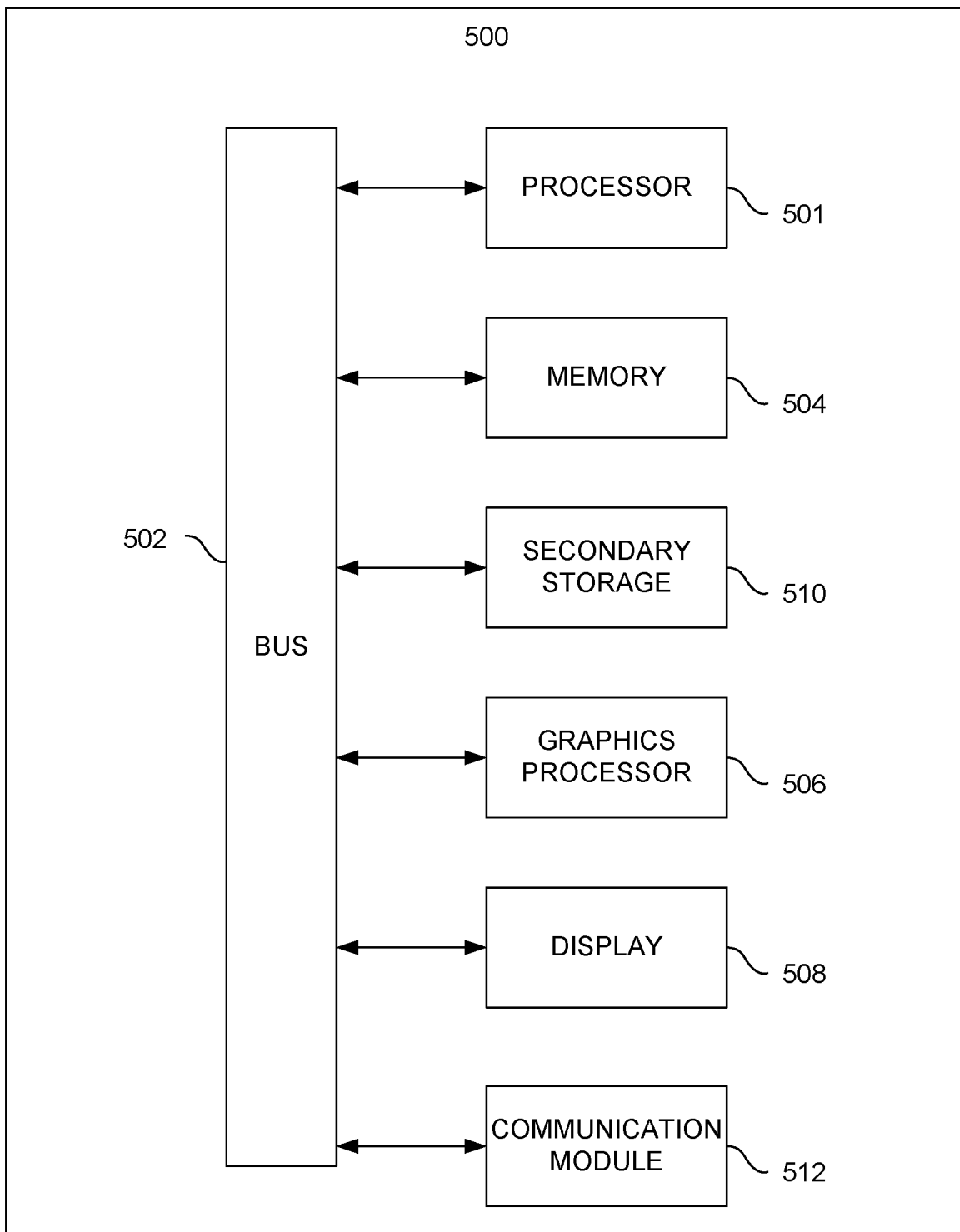
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    storing, by a system, resource information for each resource of a plurality of different resources in a network, the plurality of different resources in the network including different types of virtual and physical resources in the network, and the resource information stored for each resource of the plurality of different resources including:
        (a) a goal state for the resource,
        (b) a test specific to the resource for detecting when an actual state of the resource diverges from the goal state, and
        (c) action information associated with each action of a plurality of actions capable of being taken in association with the resource, the action information associated with each action of the plurality of actions including:
            one or more preconditions for the action, an indication of the action, one or more post-conditions for the action, and an indication of an impact to the network caused by taking the action;
    monitoring, by the system, the actual state of each resource of the plurality of different resources, including for each resource of the plurality of different resources:
        listening to events occurring in the network in association with the resource and detecting the actual state of the resource responsive to each of the events;
    responsive to determining a change in state of one of the resources of the plurality of different resources, based on the monitoring, accessing, by the system, the test specific to the one of the resources from the resource information stored for the one of the resources;
    executing, by the system, the test specific to the one of the resources;
    as a result of the execution of the test specific to the one of the resources, detecting, by the system, divergence of the actual state of the one of the resources from the goal state included in the resource information stored for the one of the resources;
    determining, by the system, a solution to return the actual state of the one of the resources to the goal state included in the resource information stored for the one of the resources, the solution including a computed activity path that returns the actual state of the resource to the goal state, wherein the solution is computed using the action information included in the resource information stored for the one of the resources; and
    executing, by the system, the solution to return the actual state of the one of the resources to the goal state included in the resource information stored for the one of the resources.

2. A system, comprising:
    a non-transitory memory storing instructions; and
    one or more processors in communication with the non-transitory memory that execute the instructions to perform a method comprising:
    storing resource information for each resource of a plurality of different resources in a network, the plurality of different resources in the network including different types of virtual and physical resources in the network, and the resource information stored for each resource of the plurality of different resources including:
        (a) a goal state for the resource,
        (b) a test specific to the resource for detecting when an actual state of the resource diverges from the goal state, and
        (c) action information associated with each action of a plurality of actions capable of being taken in association with the resource, the action information associated with each action of the plurality of actions including:
            one or more preconditions for the action, an indication of the action, one or more post-conditions for the action, and an indication of an impact to the network caused by taking the action;
    monitoring the actual state of each resource of the plurality of different resources, including for each resource of the plurality of different resources:

listening to events occurring in the network in association with the resource and detecting the actual state of the resource responsive to each of the events;

responsive to determining a change in state of one of the resources of the plurality of different resources, based on the monitoring, accessing the test specific to the one of the resources from the resource information stored for the one of the resources;

executing the test specific to the one of the resources;

as a result of the execution of the test specific to the one of the resources, detecting divergence of the actual state of the one of the resources from the goal state included in the resource information stored for the one of the resources;

determining a solution to return the actual state of the one of the resources to the goal state included in the resource information stored for the one of the resources, the solution including a computed activity path that returns the actual state of the resource to the goal state, wherein the solution is computed using the action information included in the resource information stored for the one of the resources; and executing the solution to return the actual state of the one of the resources to the goal state included in the resource information stored for the one of the resources.

3. A non-transitory computer readable medium storing computer code executable by a processor to perform a method comprising:

storing, by a system, resource information for each resource of a plurality of different resources in a network, the plurality of different resources in the network including different types of virtual and physical resources in the network, and the resource information stored for each resource of the plurality of different resources including:
(a) a goal state for the resource,
(b) a test specific to the resource for detecting when an actual state of the resource diverges from the goal state, and
(c) action information associated with each action of a plurality of actions capable of being taken in association with the resource, the action information associated with each action of the plurality of actions including:
one or more preconditions for the action, an indication of the action, one or more post-conditions for the action, and an indication of an impact to the network caused by taking the action;

monitoring, by the system, the actual state of each resource of the plurality of different resources, including for each resource of the plurality of different resources:
listening to events occurring in the network in association with the resource and detecting the actual state of the resource responsive to each of the events;
responsive to determining a change in state of one of the resources of the plurality of different resources, based on the monitoring, accessing, by the system, the test specific to the one of the resources from the resource information stored for the one of the resources;
executing, by the system, the test specific to the one of the resources;
as a result of the execution of the test specific to the one of the resources, detecting, by the system, divergence of the actual state of the one of the resources from the goal state included in the resource information stored for the one of the resources;
determining, by the system, a solution to return the actual state of the one of the resources to the goal state included in the resource information stored for the one of the resources, the solution including a computed activity path that returns the actual state of the resource to the goal state, wherein the solution is computed using the action information included in the resource information stored for the one of the resources; and
executing, by the system, the solution to return the actual state of the one of the resources to the goal state included in the resource information stored for the one of the resources.

4. The non-transitory computer readable medium of claim 3, wherein the goal state includes one of a plurality of possible states in which the resource is capable of existing in the network.

5. The non-transitory computer readable medium of claim 3, wherein the activity path is computed using the one or more preconditions and the one or more post-conditions included in the resource information stored for the one of the resources.

6. The non-transitory computer readable medium of claim 5, wherein a forward state space search is utilized to compute the activity path.

7. The non-transitory computer readable medium of claim 5, wherein when multiple possible activity paths are able to return the actual state of the one of the resources to the goal state included in the resource information stored for the one of the resources, one of the possible activity paths is selected for the solution based on a corresponding total impact to the network determined from the resource information stored for the one of the resources including the indication of the impact to the network caused by each action included in the one of the possible activity paths.

8. The non-transitory computer readable medium of claim 7, wherein the one of the possible activity paths is a least impactful activity path to the goal state.

9. The non-transitory computer readable medium of claim 3, wherein the activity path is computed responsive to onboarding of the one of the resources to the network and prior to detecting the divergence of the actual state of the one of the resources from the goal state.

10. The non-transitory computer readable medium of claim 3, wherein the activity path is computed responsive to storing additional action information for a new action associated with the one of the resources and prior to detecting the divergence of the actual state of the one of the resources from the goal state.

11. The non-transitory computer readable medium of claim 3, wherein the activity path is computed responsive to detecting the divergence of the actual state of the one of the resources from the goal state.

12. The non-transitory computer readable medium of claim 3, wherein resource information stored for each resource is stored in a record for the resource.

* * * * *